(12) United States Patent
Kang et al.

(10) Patent No.: US 10,698,657 B2
(45) Date of Patent: Jun. 30, 2020

(54) HARDWARE ACCELERATOR FOR COMPRESSED RNN ON FPGA

(71) Applicant: BEIJING DEEPHI INTELLIGENCE TECHNOLOGY CO., LTD., Beijing (CN)

(72) Inventors: Junlong Kang, Beijing (CN); Song Han, Beijing (CN); Yi Shan, Beijing (CN)

(73) Assignee: XILINX, INC., San Jose, CA (US)

(*) Notice: Subject to any disclaimer, the term of this patent is extended or adjusted under 35 U.S.C. 154(b) by 856 days.

(21) Appl. No.: 15/390,563

(22) Filed: Dec. 26, 2016

(65) Prior Publication Data

US 2018/0046897 A1  Feb. 15, 2018

Related U.S. Application Data

(63) Continuation-in-part of application No. 15/242,625, filed on Aug. 22, 2016, and a continuation-in-part of
(Continued)

(30) Foreign Application Priority Data

Aug. 12, 2016 (CN) .......................... 2016 1 0663175
Aug. 12, 2016 (CN) .......................... 2016 1 0663201
(Continued)

(51) Int. Cl.
*G06F 7/501* (2006.01)
*G06F 7/523* (2006.01)
(Continued)

(52) U.S. Cl.
CPC .............. *G06F 7/501* (2013.01); *G06F 7/523* (2013.01); *G06F 7/5443* (2013.01);
(Continued)

(58) Field of Classification Search
USPC ........................................................... 706/15
See application file for complete search history.

(56) References Cited

U.S. PATENT DOCUMENTS 9,317,482 B2   4/2016  Davis et al.
2017/0103305 A1*  4/2017  Henry .................... G06N 3/063

FOREIGN PATENT DOCUMENTS

CN          102129397 A        7/2011
CN          104915322 A        9/2015
(Continued)

OTHER PUBLICATIONS

Qiu et al., Going Deeper with Embedded FPGA Platform for Convolutional Neural Network, Feb. 21-23, 2016, ACM, FPGA '16, pp. 26-35. (Year: 2016).*
(Continued)

*Primary Examiner* — Shane D Woolwine
(74) *Attorney, Agent, or Firm* — IPro, PLLC (57) ABSTRACT

The present invention relates to recurrent neural network. In particular, the present invention relates to how to implement and accelerate a recurrent neural network based on an embedded FPGA. Specifically, it proposes an overall design processing method of matrix decoding, matrix-vector multiplication, vector accumulation and activation function. In another aspect, the present invention proposes an overall hardware design to implement and accelerate the above process.

16 Claims, 5 Drawing Sheets

Related U.S. Application Data application No. 15/242,624, filed on Aug. 22, 2016, and a continuation-in-part of application No. 15/242,622, filed on Aug. 22, 2016, now Pat. No. 10,621,486.

(30) Foreign Application Priority Data

Aug. 12, 2016 (CN) .......................... 2016 1 0663563
Dec. 5, 2016 (CN) .......................... 2016 1 1107809

(51) Int. Cl.
  G06F 7/544 (2006.01)
  G06N 3/04 (2006.01)
  G06N 3/063 (2006.01)

(52) U.S. Cl.
  CPC ........... *G06N 3/0445* (2013.01); *G06N 3/063* (2013.01); *G06F 2207/4824* (2013.01)

(56) References Cited

FOREIGN PATENT DOCUMENTS

| CN | 105488565 A | 4/2016 |
| CN | 205139973 U | 4/2016 |
| CN | 105681628 A | 6/2016 |
| CN | 105760933 A | 7/2016 |

OTHER PUBLICATIONS

Li et al., FPGA Acceleration of Recurrent Neural Network based Language Model, 2015, IEEE Computer Society, FCCM 2015, pp. 111-118. (Year: 2015).*
A Massively Parallel Coprocessor for Convolutional Neural Networks, DOI: 10.1109/ASAP.2009.25.
NeuFlow: Dataflow vision processing system-on-a-chip, DOI: 10.1109/MWSCAS.2012.6292202.
Going Deeper with Embedded FPGA Platform for Convolutional Neural Network, DOI: 10.1145/2847263.2847265.
1. Image-Net Large-Scale Vision Recognition Challenge (ILSVRC) 2012.
15. Long short-term memory recurrent neural network architectures for large scale acoustic modeling[C]//INTERSPEECH. 2014: 338-342.
16. Long short-term memory based recurrent neural network architectures for large vocabulary speech recognition[J]. arXiv preprint arXiv:1402.1128, 2014.
18. Deep compression: Compressing deep neural networks with pruning, trained quantization and Huffman coding.
19. Diannao: A small-footprint high-throughput accelerator for ubiquitous machine-learning.
21. Dadiannao: A machine-learning supercomputer.
22. Shidiannao: shifting vision processing closer to the sensor.
23. DSD: Regularizing Deep Neural Networks with Dense-Sparse-Dense Training Flow in NIPS 2016.
Learning both Weights and Connections for Efficient Neural Networks, arXiv:1506.02626v3 [cs.NE] Oct. 30, 2015.
2. Reconfigurable pipelined 2-d convolvers for fast digital signal processing.
12. A dynamically configurable coprocessor for convolutional neural networks.
3. Second order derivatives for network pruning: Optimal brain surgeon.
5. Cnp: An fpga-based processor for convolutional networks.
6. Optimizing fpga-based accelerator design for deep convolutional neural networks.
7. Pudiannao: A polyvalent machine learning accelerator.
8. DSD: Regularizing Deep Neural Networks with Dense-Sparse-Dense Training Flow in NIPS 2016.
9. Long Short-term Memory, Neural Computation 9(8):1735-80 • Dec. 1997, DOI: 10.1162/neco.1997.9.8.1735.

* cited by examiner

| weight values | $W_{00}$ | $W_{20}$ | $W_{41}$ | $W_{62}$ | $W_{43}$ | $W_{04}$ | $W_{24}$ | $W_{45}$ | $W_{26}$ |
|---|---|---|---|---|---|---|---|---|---|
| Relative Index | 0 | 0 | 4 | 4 | 2 | 1 | 0 | 4 | 2 |
| Column Pointer | 0 | 2 | 3 | 4 | 5 | 7 | 8 | 9 | 9 |

Fig. 11

HARDWARE ACCELERATOR FOR COMPRESSED RNN ON FPGA

CROSS REFERENCE TO RELATED APPLICATIONS

This application claims priority to Chinese Patent Application Number 201610663201.9 filed on Aug. 12, 2016 and Chinese Patent Application Number 201610663563.8 filed on Aug. 12, 2016, Chinese Patent Application Number 201610663175.X filed on Aug. 12, 2016, Chinese Patent Application Number 201611107809.X filed on Dec. 5, 2016, U.S. application Ser. No. 15/242,622 filed on Aug. 22, 2016, U.S. application Ser. No. 15/242,624 filed on Aug. 22, 2016, U.S. application Ser. No. 15/242,625 filed on Aug. 22, 2016, the entire content of which are incorporated herein by reference.

TECHNICAL FIELD

The present invention relates to artificial neural networks, e.g., recurrent neural network (RNN). In particular, the present invention relates to how to implement a hardware accelerator for compressed RNN based on an embedded FPGA.

BACKGROUND ART

Introduction to RNN

Recurrent Neural Network (RNN) is a class of artificial neural network where connections between units form an oriented loop. This creates an internal state of the network which allows it to exhibit dynamic temporal behavior. RNNs can handle the variable-length sequence by having a recurrent hidden state whose activation at each time is dependent on that of the previous time.

Traditionally, the standard RNN computes hidden layer at next step as:

$$h_t = f(W^{(hh)} h_{t-1} + W^{(hx)} x_t)$$

where f is a smooth, bounded function, such as a logistic sigmoid function or a hyperbolic tangent function. $W^{(hh)}$ is the state-to-state recurrent weight matrix, and $W^{(hx)}$ is the input-to-hidden weight matrix.

Input sequence is $x=(x_1, \ldots, x_T)$. We can divide the probability of a sequence of arbitrary length into:

$$p(x_1, \ldots, x_T) = p(x_1) p(x_2|x_1) p(x_3|x_1, x_2) \ldots p(x_1, \ldots, x_{T-1})$$

Figure 1:
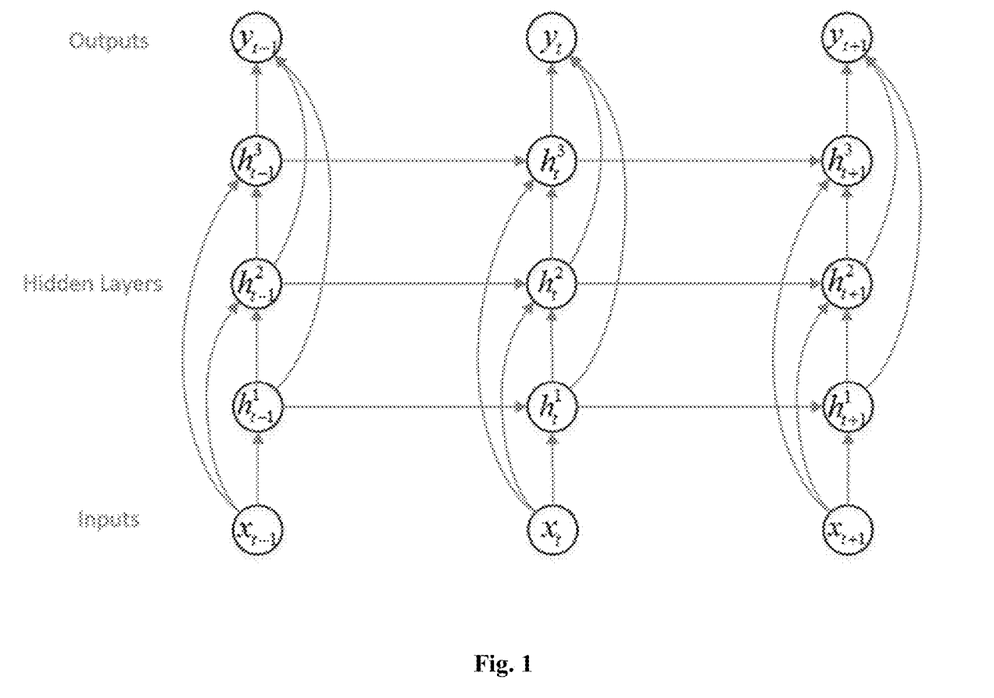
FIG. 1 shows an example of neural network comprising hidden layers.

Then, as shown in FIG. 1, we can train an RNN to model this probability distribution, and predict the probability of the next symbol $x_{t+1}$, given hidden states $h_t$ which is a function of all the previous symbols $x_1, x_2, \ldots x_t$.

$$p(x_{t+1}|x_1, \ldots, x_t) = f(h_t)$$

The hidden layer activations are computed by iterating the following equations from t=1 to T and from n=2 to N:

$$h_t^1 = \mathcal{H}(W_{ih^1} x_t + W_{h^1 h^1} h_{t-1}^1 + b_h^1)$$

$$h_t^n = \mathcal{H}(W_{ih^n} x_t + W_{h^{n-1} h^n} h_t^{n-1} + W_{h^n h^n} h_{t-1}^n + b_h^n)$$

where the W terms denote weight matrices (e.g. $W_{ih^n}$ is the weight matrix applied to the inputs to the $n^{th}$ hidden layer, $W_{h^1 h^1}$ is the recurrent weight matrix at the first hidden layer, and so on), the b terms denote bias vectors (e.g. $b_y$ is output bias vector) and H is the hidden layer function.

Given the hidden sequences, the output sequence is computed as follows:

$$\hat{y}_t = b_y + \sum_{n=1}^{N} W_{h^n y} h_t^n$$

$$y_t = y(\hat{y}_t)$$

where y is the output layer function. The complete network therefore defines a function, parameterized by the weight matrices, from input histories x 1:t to output vectors $y_t$.

Figure 2:
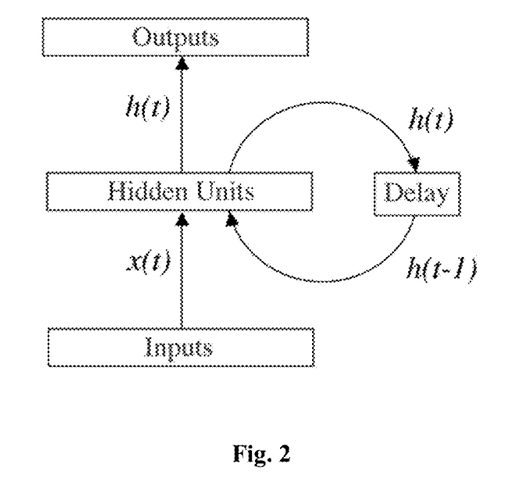
FIG. 2 shows an example of RNN model comprising hidden layers.

FIG. 2 shows a simplified basic network frame of RNNs, wherein the output of the previous hidden layer is the input of the present hidden layer. That is, the output of the present layer is related to both the hidden layer of the previous layer and the input of the present layer.

Compression of Neural Networks

In recent years, the scale of neural networks is exploding. Advanced neural network models might have billions of connections and the implementation thereof is both calculation-centric and memory-centric.

The conventional solutions typically use a general purpose CPU or GPU (graphic processing unit) to realize related algorithms. However, it is not clear how much potential can be further developed in the processing capabilities of conventional chips like CPU and GPU, as Moore's Law might fail one day. Thus, it is of critical importance to compress neural networks into smaller scale neural networks so as to reduce computation and memory consumption.

On the other hand, customized circuit can solve the above-mentioned problem, so that the customized processor can achieve better acceleration ratio in implementing a sparse neural network model.

One purpose of the present invention is to provide a customized hardware accelerator with a parallelized pipeline design. The hardware accelerator is especially suitable for sparse neural networks, and can achieve better computation efficiency while reduce processing delay.

CRS and CCS

For a sparse matrix, which is typically obtained after being compressed, it is desired to encode the matrix in order to further reduce the memory requirements. It has been proposed to encode and store sparse matrix by Compressed Row Storage (CRS) or Compressed Column Storage (CCS).

In the present application, in order to exploit the sparsity of compressed neural networks, it might encode and store the sparse weight matrix W in a variation of compressed column storage (CCS) format.

For each column $W_j$ of matrix W, it stores a vector v that contains the non-zero weights, and a second, equal-length vector z. Vector z encodes the number of zeros before the corresponding entry in v. Each entry of v and z is represented by a four-bit value. If more than 15 zeros appear before a non-zero entry we add a zero in vector v.

For example, it encodes the following column [0,0,1,2,0, 0,0,0,0,0,0,0,0,0,0,0,0,0,0,3], as v=[1,2,0,3], z=[2,0, 15,2].

v and z of all columns are stored in one large pair of arrays with a pointer vector p pointing to the beginning of the vector for each column. A final entry in p points one beyond the last vector element so that the number of non-zeros in column j (including padded zeros) is given by $p_{j+1} - p_j$.

Storing the sparse matrix by CCS format makes it easy to exploit matrix sparsity. It simply multiplies each non-zero activation by all of the non-zero elements in its corresponding column.

For further details regarding the storage of a sparse matrix, please refer to U.S. Pat. No. 9,317,482, UNIVERSAL FPGA/ASIC MATRIX-VECTOR MULTIPLICATION ARCHITECTURE. In this patent, it proposes a sparse matrix representation, referred as the Compressed Variable Length Bit Vector (CVBV) format, which is used to take advantage of the capabilities of FPGAs and reduce storage and bandwidth requirements across the matrices. Also, it discloses a class of sparse matrix formats that are better suited for FPGA implementations in reducing storage and bandwidth requirements. A partitioned CVBV format is described to enable parallel decoding.

SUMMARY

In the present invention, we propose a method for implementing a Recurrent Neural Network (RNN), wherein the weight matrices of said RNN comprises $W_{hh}$, where $W_{hh}$ is the weight matrix in hidden layers, and $W_{hx}$, where $W_{hx}$ is the weigh matrix connecting the inputs to the hidden layer, the input sequence is $x=(x_1, x_2, \ldots, x_T)$, said method comprising: Initial Step: initialize the data, namely, read all the necessary data for computing $W_{hx}x$ into FPGA on-chip memory, including input vector x and all the information about $W_{hx}$, which is the corresponding weight matrix of input vector x; Step 1: Processing elements (PE) start to compute $W_{hx}x$, meanwhile the system reads all the necessary data for computing $W_{hh}x$ into FPGA on-chip memory; Step 2: PEs starts to compute $W_{hh}h_{t-1}$, where $h_{t-1}$ is the hidden layer activation of the preceding input vector, meanwhile system reads all the necessary data for computing the next $W_{hx}x$ into FPGA on-chip memory; Process the above Step 1 and Step 2 iteratively.

Further, said Step 1 and Step 2 comprises: when computing the matrix-vector multiplication on the present input vector, system computes the activation and RNN output of the preceding input vector.

According to another aspect of the invention, we propose a method for implementing compressed RNN based on FPGA, the method comprising the following steps: a) receiving data from off-chip memory and storing the data into on-chip memory of FPGA, wherein said data are related to RNN computation, including input vector, bias vector and weight matrices data; b) decoding the data received in Step a) using FPGA on-chip processor to obtain the real weights, and storing the real weight into FPGA on-chip memory; c) matrix computation, namely, performing matrix-vector multiplication using FPGA on-chip processor and storing the result into FPGA on-chip memory; d) vector accumulation, namely, performing vector accumulation using FPGA on-chip processor and storing the results into FPGA on-chip memory, said vector includes result vector in Step c) and bias vector; e) activation function computation, namely, performing activation function on the result of the above Step d), and storing the result into FPGA on-chip memory; iterating the above Step a), b), c), d), e) to obtain the RNN activation sequences and computing the output sequence according to the activation sequences.

According to another aspect of the invention, we propose a device for implementing compressed RNN acceleration, comprising: a receiving unit, which is used to receive a plurality of input vectors and distributed them to a plurality of processing elements (PE); a plurality of processing elements (PE), each of which comprising: Reading unit for compressed weight matrices, which is used to read the weight matrices of said RNN; ALU, which is used to perform multiplication and addition calculation in said weight matrices; Calculation buffer, which is used to store the intermediate results of matrix-vector multiplication and output the results to assembling unit; an assembling unit, which is used to receive the results from PEs and assemble them into a complete result vector; a controller unit, which is used for global controlling.

Further, the above device may comprise function module which is used to perform activation function in said RNN.

Further, the above device may comprise a vector buffer, which is used to receive the RNN hidden layer activation from said function module and store the activation and bias vector.

Further, the above device may comprise an adder tree unit, which is used to perform vector accumulation on vectors from assembling unit and vector buffer.

Further, in the above device, said receiving unit may comprise a plurality of first-in-first-out buffer, each of which corresponds to a PE.

Further, in the above device, said reading unit for compressed matrices may comprise: location unit, which is used to read and store the location information of non-zero elements in the compressed weight matrix; decoding unit, which is used to decoding the compressed weight matrix to obtain the weight value of the compressed weight matrix.

Further, in the above device, said ALU may comprise: a plurality of multipliers which are used to perform multiplication operation on matrix element and input vector element; and a plurality of adders which is used to perform addition operation on the results of above multiplication operation.

Further, in the above device, said buffer may comprise a first output buffer and a second output buffer, said first and second buffer receive and output computation result alternatively, namely, while one buffer is receiving present computation result, the other one outputs the preceding computation result.

Further, in the above device, said vector buffer may comprise a plurality of sub-buffers which are used to store computation results of each hidden layer.

EMBODIMENTS OF THE INVENTION

Previous Research Product of the Inventors: Parallel Processing Neural Network by EIE One of the co-inventors of the present invention has proposed and disclosed an Efficient Inference Engine (EIE, Efficient Inference Engine on Compressed Deep Neural Network). For a better understanding of the present invention, the EIE solution is briefly introduced here.

Figure 3:
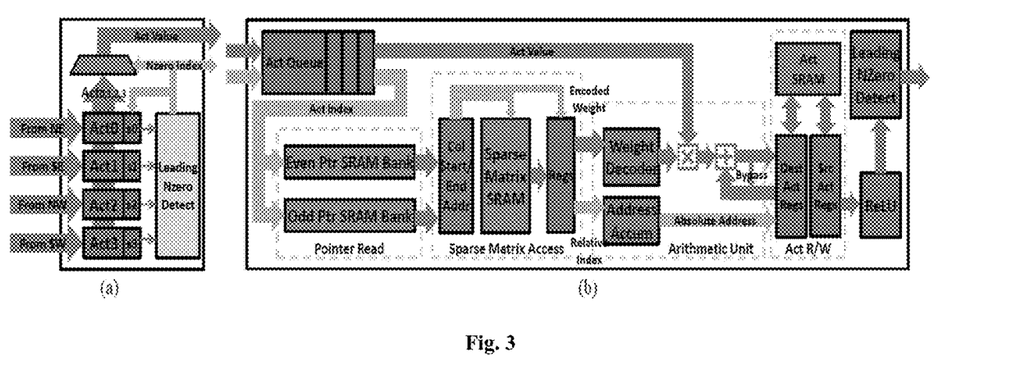
FIG. 3 shows an Efficient Inference Engine (EIE) used for implementing compressed neural network.

FIG. 3 shows the architecture of Efficient Inference Engine (EIE) that applies to compressed neural network model in machine learning, especially for the compressed neural network model stored in the above CCS or CRS format.

A Central Control Unit (CCU) controls an array of PEs that each computes one slice of the compressed network. The CCU also receives non-zero input activations from a distributed leading nonzero detection network and broadcasts these to the PEs.

Almost all computation in EIE is local to the PEs except for the collection of non-zero input activations that are broadcast to all PEs. However, the timing of the activation collection and broadcast is non-critical as most PEs take many cycles to consume each input activation.

Activation Queue and Load Balancing

Non-zero elements of the input activation vector $a_j$ and their corresponding index j are broadcast by the CCU to an activation queue in each PE. The broadcast is disabled if any PE has a full queue. At any point in time each PE processes the activation at the head of its queue.

The activation queue allows each PE to build up a backlog of work to even out load imbalance that may arise because the number of non-zeros in a given column j may vary from PE to PE.

Pointer Read Unit

The index j of the entry at the head of the activation queue is used to look up the start and end pointers $p_j$ and $p_{j+1}$ for the v and x arrays for column j. To allow both pointers to be read in one cycle using single-ported SRAM arrays, we store pointers in two SRAM banks and use the LSB of the address to select between banks. $p_j$ and $p_{j+1}$ will always be in different banks. EIE pointers are 16-bits in length.

Sparse Matrix Read Unit

The sparse-matrix read unit uses pointers $p_j$ and $p_{j+1}$ to read the non-zero elements (if any) of this PE's slice of column $I_j$ from the sparse-matrix SRAM. Each entry in the SRAM is 8-bits in length and contains one 4-bit element of v and one 4-bit element of x.

For efficiency the PE's slice of encoded sparse matrix I is stored in a 64-bit-wide SRAM. Thus eight entries are fetched on each SRAM read. The high 13 bits of the current pointer p selects an SRAM row, and the low 3-bits select one of the eight entries in that row. A single (v, x) entry is provided to the arithmetic unit each cycle.

Arithmetic Unit

The arithmetic unit receives a (v, x) entry from the sparse matrix read unit and performs the multiply accumulate operation $b_x = b_x + v \times a_j$. Index x is used to index an accumulator array (the destination activation registers) while v is multiplied by the activation value at the head of the activation queue. Because v is stored in 4-bit encoded form, it is first expanded to a 16-bit fixed-point number via a table look up. A bypass path is provided to route the output of the adder to its input if the same accumulator is selected on two adjacent cycles.

Activation Read/Write

The Activation Read/Write Unit contains two activation register files that accommodate the source and destination activation values respectively during a single round of FC layer computation. The source and destination register files exchange their role for next layer. Thus no additional data transfer is needed to support multilayer feed-forward computation.

Each activation register file holds 64 16-bit activations. This is sufficient to accommodate 4K activation vectors across 64 PEs. Longer activation vectors can be accommodated with the 2 KB activation SRAM. When the activation vector has a length greater than 4K, the M×V will be completed in several batches, where each batch is of length 4K or less. All the local reduction is done in the register, and SRAM is read only at the beginning and written at the end of the batch.

Distributed Leading Non-Zero Detection

Input activations are hierarchically distributed to each PE. To take advantage of the input vector sparsity, we use leading non-zero detection logic to select the first positive result. Each group of 4 PEs does a local leading non-zero detection on input activation. The result is sent to a Leading Non-Zero Detection Node (LNZD Node) illustrated in FIG. 3. Four of LNZD Nodes find the next non-zero activation and sends the result up the LNZD Node quadtree. That way the wiring would not increase as we add PEs. At the root LNZD Node, the positive activation is broadcast back to all the PEs via a separate wire placed in an H-tree.

Central Control Unit

The Central Control Unit (CCU) is the root LNZD Node. It communicates with the master such as CPU and monitors the state of every PE by setting the control registers. There are two modes in the Central Unit: I/O and Computing.

In the I/O mode, all of the PEs are idle while the activations and weights in every PE can be accessed by a DMA connected with the Central Unit.

In the Computing mode, the CCU will keep collecting and sending the values from source activation banks in sequential order until the input length is exceeded. By setting the input length and starting address of pointer array, EIE will be instructed to execute different layers.

Figure 4:
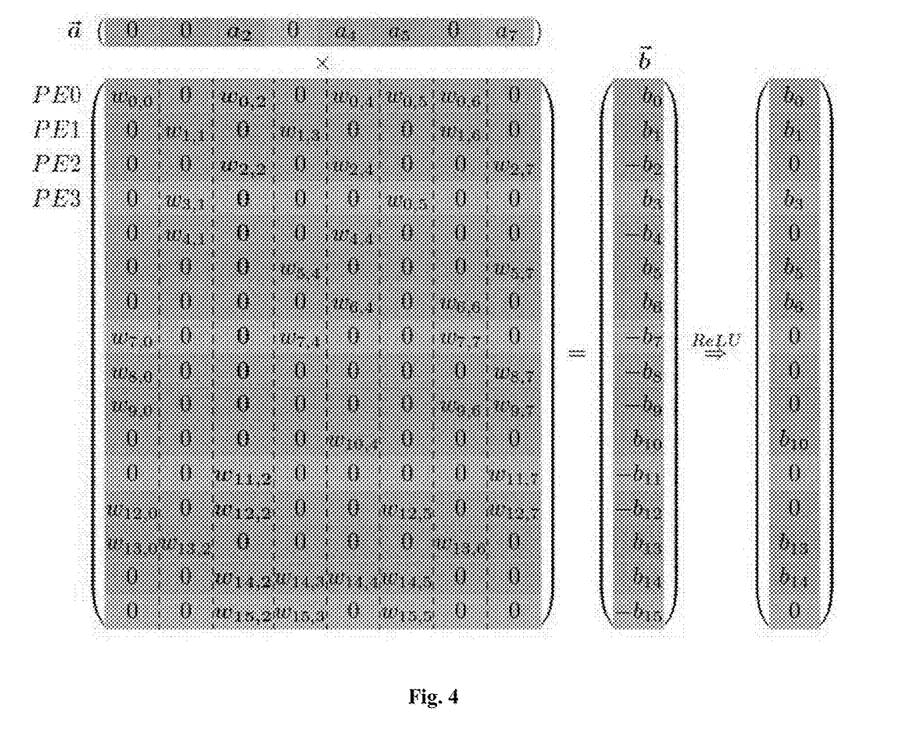
FIG. 4 shows how weight matrix W and input vectors a, b are distributed among a plurality of processing elements (PE) in the hardware according to FIG. 3.

FIG. 4 shows how to distribute the matrix and parallelize matrix-vector computation by interleaving the rows of the matrix W over multiple processing elements (PEs).

With N $PE_s$, $PE_k$ holds all rows output activations bi, and input activations $a_i$ for which i (mod N)=k. The portion of column $W_j$ in $PE_k$ is stored in the CCS format but with the zero counts referring only to zeros in the subset of the column in this PE. Each PE has its own v, x, and p arrays that encode its fraction of the sparse matrix.

In FIG. 4, Matrix W and vectors a and b are interleaved over 4 PEs. Elements of the same color are stored in the same PE.

In FIG. 4, it shows an example multiplying an input activation vector a (of length 8) by a 16×8 weight matrix W yielding an output activation vector b (of length 16) on N=4 PEs. The elements of a, b, and W are color coded with their PE assignments. Each PE owns 4 rows of W, 2 elements of a, and 4 elements of b.

It performs the sparse matrix×sparse vector operation by scanning vector a to find its next non-zero value $a_j$ and broadcasting $a_j$ along with its index j to all PEs. Each PE then multiplies $a_j$ by the non-zero elements in its portion of column $W_j$—accumulating the partial sums in accumulators for each element of the output activation vector b. In the CCS representation, these non-zeros weights are stored contiguously so each PE simply walks through its v array from location $p_j$ to $p_{j+1}$-1 to load the weights. To address the output accumulators, the row number i corresponding to each weight $W_{ij}$ is generated by keeping a running sum of the entries of the x array.

In the example of FIG. 4, the first non-zero is $a_2$ on $PE_2$. The value $a_2$ and its column index 2 is broadcast to all PEs. Each PE then multiplies $a_2$ by every non-zero in its portion of column 2. $PE_0$ multiplies $a_2$ by $W_{0,2}$ and $W_{12,2}$; $PE_1$ has all zeros in column 2 and so performs no multiplications; $PE_2$ multiplies $a_2$ by $W_{2,2}$ and $W_{14,2}$, and so on. The result of each dot product is summed into the corresponding row accumulator. For example $PE_0$ computes $b_0=b_0+W_{0,2}a_2$ and $b_{12}=b_{12}+W_{12,2}a_2$. The accumulators are initialized to zero before each layer computation.

The interleaved CCS representation facilitates exploitation of both the dynamic sparsity of activation vector a and the static sparsity of the weight matrix W.

It exploits activation sparsity by broadcasting only non-zero elements of input activation a. Columns corresponding to zeros in vector a are completely skipped. The interleaved CCS representation allows each PE to quickly find the non-zeros in each column to be multiplied by $a_j$. This organization also keeps all of the computation except for the broadcast of the input activations local to a PE.

Figure 5:
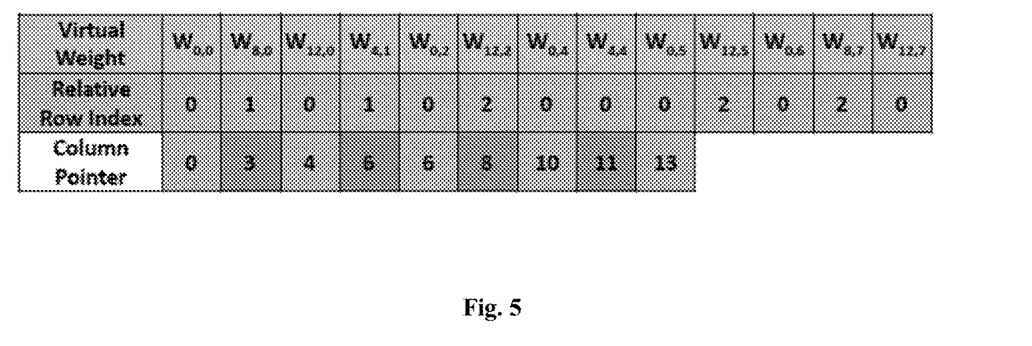
FIG. 5 shows the CCS format matrix corresponding to a $PE_0$ in FIG. 4.

FIG. 5 shows the CCS representation of matrix in FIG. 4.

In particular, FIG. 5 shows the CCS format matrix to be processed by a $PE_0$ in FIG. 4.

The relative row index: it indicates the number of zero-value weights between the present non-zero weight and the previous non-zero weight.

The column pointer: the value by the present column pointer reducing the previous column pointer indicates the number of non-zero weights in this column.

Thus, by referring to the index and pointer of FIG. 5, the non-zero weights can be accessed in the following manner. (1) Reading two consecutive column pointers and obtain the reduction value, said reduction value is the number of non-zero weights in this column. (2) By referring to the row index, the row address of said non-zero weights can be obtained. In this way, both the row address and column address of a non-zero weight can be obtained.

In FIG. 5, the weights have been further encoded as virtual weights. In order to obtain the real weights, it is necessary to decode the virtual weights.

Figure 6:
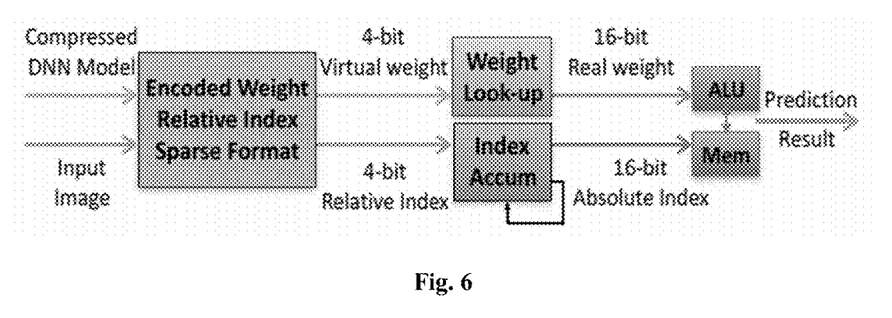
FIG. 6 shows a more detailed structure of the Weight Decoder shown in FIG. 3.

FIG. 6 shows more details of the weight decoder of the EIE solution shown in FIG. 3.

In FIG. 6, Weight Look-up and Index Accum correspond to the Weight Decoder in FIG. 3. By using said index, Weight Look-up, and a codebook, it decodes a virtual weight (e.g. 4-bit) to a real weight (16-bit).

With weight sharing, it is possible to store only a short (4-bit) index for each weight. Thus, in such a solution, the compressed DNN is indexed with a codebook to exploit its sparsity. It will be decoded from virtual weights to real weights before it is implemented in the proposed EIE hardware structure.

Further Improvement of the Present Invention

As stated above, dense RNNs in prior art need relatively immense I/O bandwidth, storage and computation resources. In order to meet algorithm requirements and make RNN easier to be employed, neural network compression is becoming more and more popular.

The compressed neural network needs to be encoded for storage, and the encoded network needs to be decoded before computation.

However, the general purpose processor cannot fully take advantage of the sparsity of the compressed neural network. Experiment data has shown that acceleration ratio achieved by general purpose processor (CPU or GPU) is quiet limited when compression ratio is relatively big.

Thus, one purpose of the present invention is to provide a device and a method for implementing a hardware accelerator for compressed RNN based on FPGA, so as to achieve better computational performance and reduce response delay.

In order to achieve the above mentioned purpose, the present invention proposes a customized circuit for the compressed RNN models, which involves a particular state machine for compressed RNN, ping-pong buffers and parallelized pipeline. These designs enable the present invention to balance I/O bandwidth and computational efficiency, achieving better performance with lower power consumption.

Compared to EIE, which accelerates a part of neural networks (that is, accelerates matrix-vector multiplication), the present invention further accelerates computation in the entire neural network, including not only matrix-vector multiplication but also vector accumulation (e.g., adder tree operations) and activation function operations.

Figure 7:
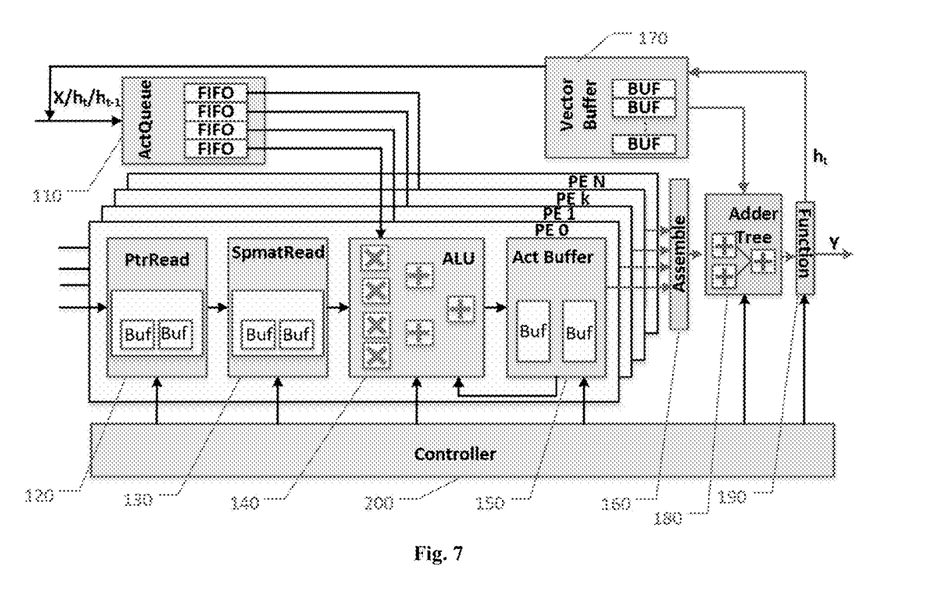
FIG. 7 shows the hardware layout of one embodiment with multiple processing elements (PEs) according to this invention.

FIG. 7 shows the hardware layout of one embodiment of this invention with multiple processing elements (PEs). It is composed of the following major modules:

ActQueue Unit 110: ActQueue Unit 110 receives and stores input vectors, and then sends them to ALU 140. Input vectors of ActQueue 110 include vector x in RNN's input sequence and hidden layer activation h.

Further, ActQueue Unit 110 may comprise several first-in-first-out buffers (FIFOs), each of which corresponds to one PE. The FIFOs are used to balance the computation workload across different PEs. The depth of the FIFOs can be decided according to experience. If the depth of the FIFOs is too large, it is a waste of resources. Meanwhile, if the depth of the FIFOs is too small, it cannot effectively balance the workload imbalance across different PEs.

A plurality of PEs might share input vectors.

PtrRead Unit 120: PtrRead Unit 120 reads and stores the pointers in the compressed neural network, and then outputs the pointers to SpmatRead Unit 130.

For example, if the compressed neural network is stored in CCS format, PtrRead Unit 120 will store column pointers (the third row in FIG. 5). Here, the index j of the first element $a_j$ in the ActQueue Unit 110 is used to look up the start pointers $P_j$ and the end pointer $P_{j+1}$ of the column. And the value of $P_{j+1}-P_j$ represents the number of non-zero elements in column j.

In one of the embodiments of this invention, PtrRead Unit 110 includes a pair of ping-pong buffers.

SpmatRead Unit 130: SpmatRead Unit 130 reads and stores weight information of the compressed neural network and outputs them to ALU 140.

In one of the embodiments of this invention, weight information includes relative index and weight value (the first two rows in FIG. 5).

In one of the embodiments of this invention, information read and processing in SpmatRead Unit 130 are also performed by two ping-pong buffers.

SpatRead Unit 130 receives pointer $P_j$ and $P_{j+1}$ from PtrRead Unit 120, the corresponding weight value can be read according to the value of received pointers. Weight value in Column j can be loaded through moving the pointer from $P_j$ to $P_{j-1}$-1.

ALU 140: The ALU 140 receives relative index and weight from the SpmatRead Unit 130 and input vector elements from ActQueue Unit 110. ALU performs multiply-accumulate operation based on input data, and outputs the result to Act Buffer 150.

The computation in ALU 140 is operated in the following two steps. First, the element of input vector is multiplied by the weight value; Second, ALU reads the previous accumulated result stored in Act Buffer 150 according to the relative index and add this accumulated result to the result of the first step.

In the preferred embodiment of this invention, to accelerate the calculation, ALU 140 employs a plurality of Multipliers and Adders to process the multiply-accumulate calculation of elements in one column in a parallel manner. As shown in FIG. 7, the ALU 140 employs 4 Multipliers and 3 Adders.

Act Buffer 150: Act Buffer 150 stores intermediate results as well as final results of computation in each PE. Here, in order to improve computational efficiency, the buffers are also implemented as ping-pong buffers.

Assemble Unit 160: Assemble Unit 160 receives multiply-accumulation results from Act Buffer 150 of each PE and assembles them into a complete result to be output to Adder Tree 180.

Due to the parallel design of this invention, each PE will perform multiply-accumulation operation on a fraction of a weight matrix and output a part of the result vector. The Assemble Unit 160 is used for assembling those parts into a complete result vector.

Vector Buffer 170: Vector Buffer 170 is FPGA on-chip memory that stores the hidden layer computation and bias vectors of RNN for subsequent acceleration.

As stated above, the hidden layer activations are computed by iterating the following equations from t=1 to T and from n=2 to N:

$$h_t^1 = \mathcal{H}(W_{ih^1}x_t + W_{h^1h^1}h_{t-1}^1 + b_h^1)$$

$$h_t^n = \mathcal{H}(W_{ih^n}x_t + W_{h^{n-1}h^n}h_t^{n-1} + W_{h^nh^n}h_{t-1}^n + b_h^n)$$

The Vector Buffer 170 comprises a group of buffers for storing the computational result $h_t$ of each hidden layer, so as to quickly read the results for later computation. When $h_t$ is needed by ActQueue 110 or Adder Tree 180, it can be read quickly from Vector Buffer 170.

Adder Tree 180: Adder Tree performs vector accumulation in RNN. When all the PEs finish the matrix-vector multiplications, Adder Tree will accumulate the results (namely, the accumulation operations in the below formulas) and output this result to Function Module 190.

$$h_t^1 = \mathcal{H}(W_{ih^1}x_t + W_{h^1h^1}h_{t-1}^1 + b_h^1)$$

$$h_t^n = \mathcal{H}(W_{ih^n}x_t + W_{h^{n-1}h^n}h_t^{n-1} + W_{h^nh^n}h_{t-1}^n + b_h^n)$$

$$\hat{y}_t = b_y + \sum_{n=1} W_{h^ny}h_t^n$$

Function Module 190: Function Module 190 is used for performing activation functions.

Common used activation functions include sigmoid/tan h. After the Adder Tree 180 finishes all the accumulation operation, the final results can be generated through Function Module 190.

Controller Module 200: Controller Module 200 is used for global control, which includes control reading of the pointers, signal synchronization between input vectors and weight values, switch of ping-pong buffers, calculation of ALU 150, etc.

The present invention employs a state machine. The RNN operation is performed through the state transition of the state machine. In the present invention, the parallelized pipeline design of the customized circuit is reflected in the control of the state machine. Pipeline design can effectively balance the I/O bandwidth and the computational efficiency for specific RNN models.

Figure 8:
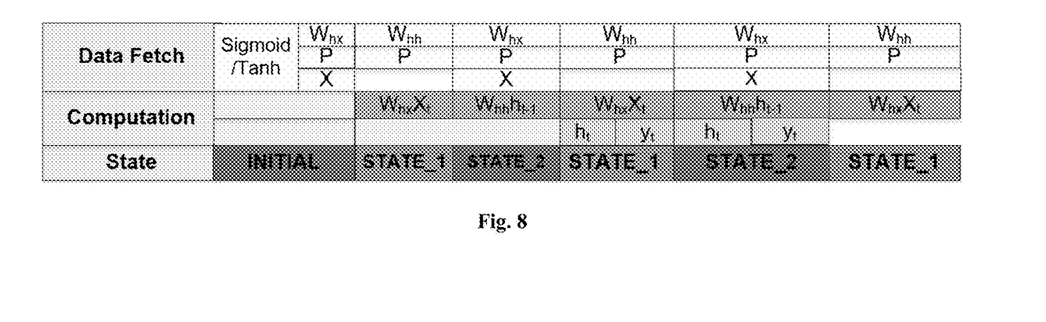
FIG. 8 shows a state machine and its state transition according to one embodiment of the present invention.

FIG. 8 shows the state transition of a state machine according to one embodiment of the present invention.

Specifically, each state involves data fetching and computation. Operations in the first three lines of FIG. 8 are fetching weights, pointers, input vectors to prepare for the next computation. Operations in the fourth line are matrix-vector multiplications, and operations in the fifth line are computations involving accumulation and activation functions etc. Operations in horizontal direction have to be executed sequentially, while those in vertical direction are executed concurrently.

In one embodiment of the present invention, the state machine includes three states.

In the initial State, it performs data initialization. That is, it prepares all the necessary data for computing $W_{hx}x$, where x is the input vector, and $W_{hx}$ is the corresponding weight matrix. For example, if the matrix is stored in CCS format, pointers, relative indexes and weight values are prepared.

In State_1, PEs calculates $W_{hx}x$, while fetching pointers and $W_{hh}$ from the memory out of PEs.

In State_2, PEs calculates $W_{hh}h_{t-1}$, while fetching the next input vector x, the corresponding $W_{hx}$ and pointers from a memory provided out of PE, for example.

As shown in FIG. 8, State_1 and State_2 are conducted alternatively.

Calculation of matrix-vector multiplication of current layer (the fourth row in FIG. 8) is performed in parallel with accumulation and activation function operation of the preceding layer (the fifth row in FIG. 8), so as to achieve efficient pipeline computation.

Initialization of input vector x is performed by ActQueue Unit 110, and initialization of $W_{hx}$ is performed by PrtRead Unit 120 and SpmatRead Unit 130.

In one of the embodiment of present invention, compressed RNN hardware accelerator is implemented by the above units in the following steps:

Step 1: this step involves initialization. More specifically, PtrRead Unit 120 reads location information of the weight matrix according to global control information;

Step 2: according to the location information obtained in Step 1, SpmatRead Unit 130 reads the location indexes and weight values of the sparse neural network;

Step 3: it broadcast the input vectors to the PEs according to global control information;

Step 4: ALU 140 multiplies the weight value from SpmatRead Unit 130 by the corresponding element of input vector from ActQueue Unit 110 and obtains the intermediate result of matrix-vector multiplication. It stores the intermediate result in Act Buffer 150;

Step 5: ALU 140 reads the corresponding intermediate result in Act Buffer 150 according to the location index in Step 2, and adds this intermediate result with the result in Step 4;

Step 6: output the result in Step 5 into Act Buffer 150 according to the location index in Step 2;

Step 7: Adder Tree 180 reads the data of the hidden layer stored in Act Buffer 150 (via Assemble Unit 160) and Vector Buffer 170, and adds these data;

Step 8: Function Module 190 performs activation function on the result in Step 7 and obtain the intermediate or final results. Store the intermediate result in Vector Buffer 170.

EXAMPLE

Now, an example is given to better illustrate the general work principle of computations conducted on the hardware acceleration of the present invention. In the example, 2 PEs ($PE_0$ and $PE_1$) are used to perform a matrix-vector multiplication, wherein the RNN is stored in CSS format.

The sparsity of the compressed matrix is imbalanced, leading to a low efficiency of computation resource.

Figure 9:
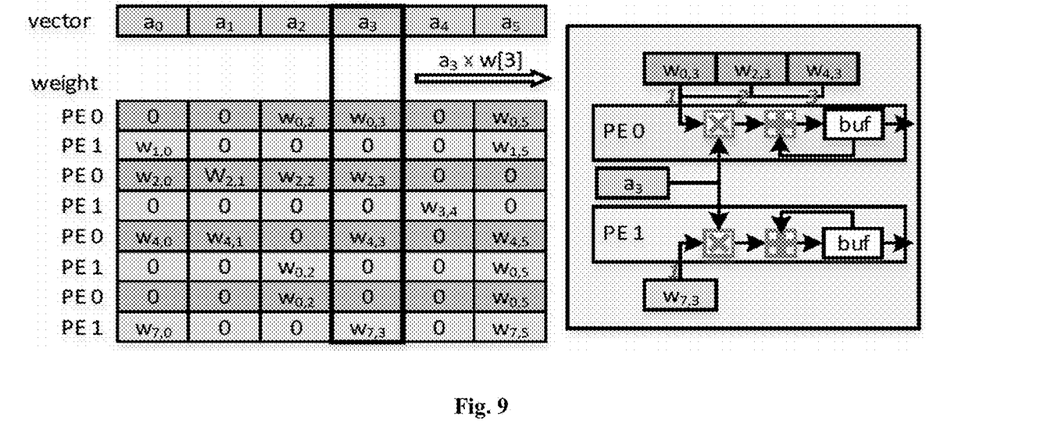
FIG. 9 shows how the efficiency is effected by the imbalanced sparsity in the matrix.

FIG. 9 shows how to compute the matrix W and input vector on the basis of the hardware design of the present invention.

As shown in FIG. 9, the input vector contains 6 elements $\{a_0, a_1, a_2, a_3, a_4, a_5, a_6\}$, and the weight matrix contains 8×6 elements. As there are 2 PEs to calculate $a_3 \times w[3]$, where a3 is the fourth element in the input vector and w[3] represents the fourth column in the weight matrix.

As shown in FIG. 9, the workloads in PEs are different. PE0 performs 3 multiply-add operations while PE1 is required to take only 1 multiply-add.

In prior art, after $PE_1$ finishes calculation on $a_3$, the system will keep it waiting until $PE_0$ finishes all the 3 calculation, then $PE_1$ continues to perform calculation on $a_4$.

In one embodiment of the present invention, however, the ActQueue Unit 110 contains first-in-first-out buffers (FIFO), which will load part of the input vector. In such embodiment, after finishing calculation on $a_3$, $PE_1$ will continue to read $a_4$ from FIFO and calculate on it. Such design will balance the sparsity of elements among PEs and increase the efficiency of computation resource.

Figure 10:
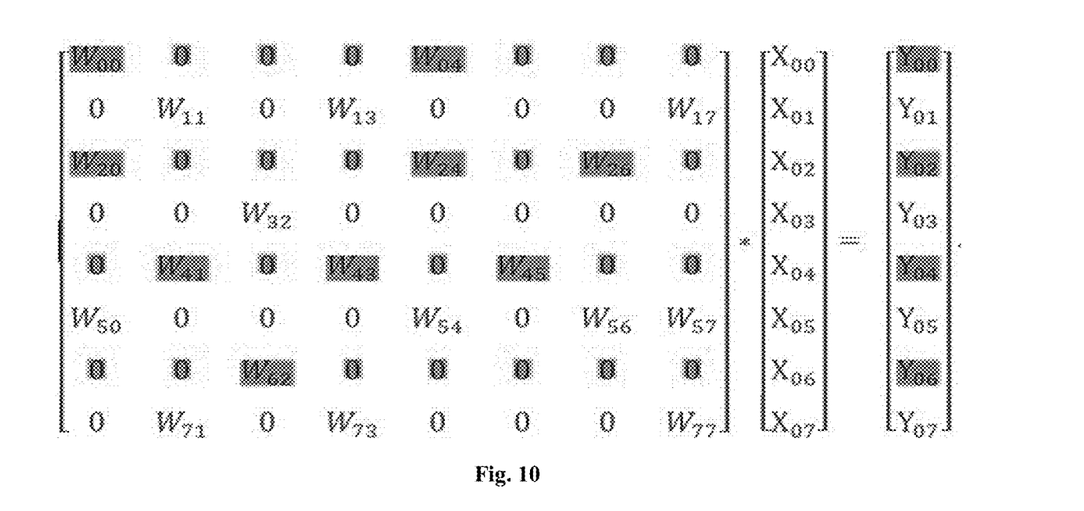
FIG. 10 shows an exemplary matrix computation in one embodiment of the present invention.

As shown in FIG. 10, odd row elements are computed by $PE_0$, and even row elements are computed by $PE_1$. Odd elements of the result vector are computed by $PE_0$, and even elements of the result vector are computed by $PE_1$. The input vector is broadcasted to $PE_0$ and $PE_1$.

The operation in $PE_0$ is described as follows.

Figure 11:
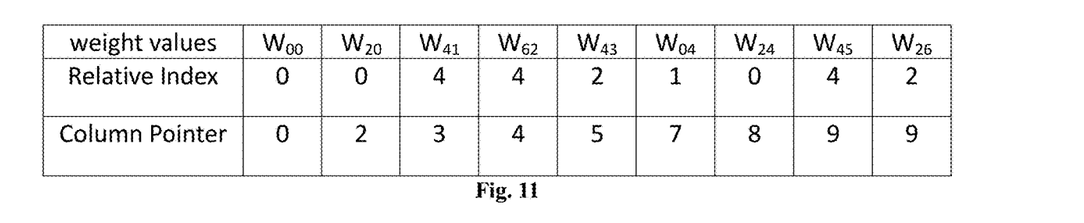
FIG. 11 shows how the matrix is stored at one processing element in the FIG. 10.

FIG. 11 shows the weight and corresponding relative index and column pointer in $PE_0$.

ActQueue Unit 110: it stores the input vector $x_t$. This module broadcasts the input vector to $PE_0$ and $PE_1$. Moreover, this module comprises several FIFOs to balance the load imbalance across the two PEs.

PtrRead Unit 120: it reads and stores the column position of the odd row non-zero elements, wherein the value of $P_{j-1}$-$P_j$ represents the number of non-zero elements in column j.

SpmatRead Unit 130: it reads and stores the weight value and the relative index of the odd row non-zero elements, for example $W_{00}$. And then it outputs $W_{00}$ to ALU 140 to calculation $W_{00} \cdot X_{00}$ and stores the result in Act Buffer 150. After this row's calculation has completed, Act Buffer 150 outputs the intermediate results ($W_{00} \cdot X_{00}$ and $W_{04} \cdot X_{04}$) to ALU 140 to calculate $Y_0$.

Assemble 160 assembles $Y_0, Y_2, Y_4, Y_6$ from $PE_0$ and $Y_1, Y_3, Y_5, Y_7$ from $PE_1$ to get the complete matrix-vector multiplication result Y.

Thus, it finishes calculation of one matrix-vector multiplication.

The output vector Y is used for vector accumulation and activation function operation to obtain hidden layer activation h. Hidden layer activation h is stored in output buffer 170. After calculation of other hidden layers are finished, the adder tree 180 will compute and output the final result.

Beneficial Technical Effects

Based on the above technical solution, the RNN acceleration device and method according to the present invention facilitates in obtaining a better balanced usage of the computational resources, storage resources and logic resources on the chip by means of a customized circuit involving ping-pong buffers and parallelized pipeline. Therefore, the device and method according to the present invention achieves better computation efficiency while reduces processing delay.

Further, comparison is made to the EIE hardware structure proposed by one of the inventors earlier. In EIE, an ALU can perform only one Multiply-Accumulate calculation in one cycle. However, the modules before or after ALU requires more storage and logic unit. Moreover, if we increase the concurrency of the process, it requires more storage and logic resources, which makes computational resources, storage resources and logic resources more unbalanced in the chips.

On the other hand, the ALU Module of the present invention can realize multiple Multiply-Accumulate calculations in one cycle without increasing other logic circuits. Therefore, computational resources, storage and logic resources are more evenly distributed.

In a conventional FPGA, a chip might comprise more than three hundred thousands of look-up-table (LUT) resources, more than six hundred thousands of FF register resources, more than a thousand of on-chip RAM resources, and more than two thousands of DSP resources.

For example, for a matrix-vector multiplication (wherein the matrix is at a size of 2048*1024, and the input vector has 1024 elements), conventional hardware will use 32 PEs, 32 PtrRead Units, 32 SpmatRead Units, 32 Act Buffer Units, and 32 Multiply-Accumulate DSPs. Accordingly, LUT will utilize 22% of the resources, FF will utilize 15% of the resources, on-chip RAM will utilize 20% of the resources, while DSP will only utilize 1.5% of the resources. Obviously, the resources of the whole chip are not evenly or fully utilized.

However, according to the hardware of the present invention, each PE will use 10 Multiply-Accumulate DSPs to compute concurrently. As a result, DSP will utilize 15% of the resources. Thus, the resources of the whole chip are more evenly utilized. Meanwhile, computation will consume less time and computational efficiency will improve. It is also helpful to further develop hardware with higher parallelism.

What is claimed is:

1. A device for implementing compressed RNN (recurrent neural network), said device comprising:
   a receiving unit, which is used to receive a plurality of input vectors and distribute them to a plurality of processing elements (PE);
   the plurality of processing elements (PE), each of which comprising:
      a reading unit configured to read weight matrices W, said W indicates weights of said RNN;
      an Arithmetic Logic Unit (ALU) configured to perform multiplication and addition calculation of said weight matrices W; and
      a calculation buffer configured to store intermediate results of matrix-vector multiplication and output the results to an assembling unit;

the assembling unit configured to receive the results from the PEs and assemble the results into a complete result vector; and a controller unit configured for implementing a state machine to control said plurality of processing elements and the receiving unit for the plurality of processing elements and the receiving unit to work in a parallelized pipeline, wherein the state machine has three states, an initial state in which an input vector and a corresponding weight matrix are prepared, a state 1 and a state 2, wherein, during each of the state 1 and state 2, calculation of matrix-vector multiplication of a current layer is performed in parallel with accumulation and activation function operation of a preceding layer to achieve pipeline computation, wherein the state 1 and state 2 are conducted alternatively.

2. The device of claim 1, further comprising:
a hidden layer unit, configured to perform a hidden layer's activation function of said RNN.

3. The device of claim 2, further comprising:
a vector buffer configured to receive an activation vector of the hidden layer from said hidden layer unit and store the activation vector and a bias vector.

4. The device of claim 3, further comprising:
an adder tree unit configured to perform vector accumulation on vectors output from the assembling unit and the vector buffer.

5. The device of claim 1, wherein said receiving unit further comprises:
a plurality of first-in-first-out buffer, each of which corresponds to a PE.

6. The device of claim 1, wherein said reading unit further comprises:
a location unit configured to read and store location information of non-zero elements in the weight matrices W;
a decoding unit configured to decode the weight matrix to obtain the weight value of the weight matrices W.

7. The device of claim 1, wherein said ALU comprises:
a plurality of multipliers configured to perform multiplication operation on matrix elements and input vector elements;
a plurality of adders configured to perform addition operation on results of the multiplication operation.

8. The device of claim 1, wherein said calculation buffer comprises:
a first output buffer and a second output buffer, said first output buffer and second output buffer receive and output a computation result alternatively, wherein while one buffer receives a present computation result, the other buffer outputs a previous computation result.

9. The device of claim 3, wherein said vector buffer further comprises:
a plurality of sub-buffers configured to store computation results of respective hidden layers.

10. A method for implementing a compressed Recurrent Neural Network (RNN) based on a device, comprising:
a) receiving data from an off-chip memory and storing the data into anon-chip memory of the device, wherein said data are related to RNN computation, said data including an input vector, a bias vector, and weight matrices;
b) decoding the data received in step a) using anon-chip processor of the device in order to obtain real weights, and storing the real weights into the on-chip memory of the device;
c) matrix computing by performing matrix-vector multiplication using on-chip processing elements of the device and storing a result of the matrix computation into the on-chip memory of the device;
d) vector accumulating by performing vector accumulation on vectors using the on-chip processing elements of the device and storing a result of the vector accumulation into the on-chip memory of the device, said vectors including both a resultant vector obtained in step c) and said bias vector;
e) activation function computing by performing activation function on the result of the vector accumulation obtained in the above step d), and storing a result of the activation function into the on-chip memory of the device; and
iterating the above steps a), b), c), d), e) to transition between three different states of a state machine to obtain the RNN's activation sequences and computing the RNN's output sequence according to the activation sequences in a parallelized pipeline, wherein the three different states of the state machine include: an initial state, a state 1 and a state 2, wherein during the initial state steps a) and b) are performed, wherein during each of the state 1 and the state 2 steps c), d) and e) are performed to carry out calculation of matrix-vector multiplication of a current layer in parallel with accumulation and activation function operation of a preceding layer to achieve pipeline computation, wherein the state 1 and state 2 are conducted alternatively.

11. The method of claim 10, further comprising:
distributing the received data to the on-chip processing elements (PE) after receiving data in step a); and
assembling results from each PE to obtain a complete result vector of matrix-vector multiplication after computation in step c).

12. The method of claim 11, further comprising:
in each PE, providing a plurality of on-chip adders and multipliers for parallel processing.

13. The method of claim 10, in at least one of said steps a), b), c), providing a pair of ping-pong buffers in the on-chip memory.

14. A method for implementing a Recurrent Neural Network (RNN), wherein weights of said RNN being characterized by $W_{hh}$ and $W_{hx}$, where $W_{hh}$ is a weight matrix of hidden layers of said RNN, $W_{hx}$ is a weight matrix being applied to input of the hidden layers, where an activation to be applied to an input vector by said hidden layers is $h_t$, the input of the hidden layers of said RNN is a series of input vectors $x=(x_1, x_2, \ldots, x_T)$, said method comprising:
an initialization step of reading a first piece of data for computing $W_{hxx}$ into anon-chip memory of a device, said first piece of data including an input vector of the series of input vectors x and $W_{hx}$;
step 1 of computing $W_{hx}x$ by processing elements of said device and reading a second piece of data for computing $W_{hh}x$ into the on chip memory of the device, the second piece of data including $W_{hh}$;
step 2 of computing $W_{hh}h_{t-1}$ by the processing elements of said device, where $h_{t-1}$ is an activation to be applied to a previous input vector by the hidden layer, and reading a third piece of data for computing a next $W_{hx}x$ into the on-chip memory of the device, the third piece of data including a next input vector; and
iteratively repeating said step 1 and step 2, wherein the initialization step, step 1 and step 2 are performed during three states of a state machine corresponding to an initial state, a state 1 and a state 2, wherein, during each of the state 1 and state 2, calculation of matrix-vector multiplication of a current layer is performed in parallel with accumulation and activation function operation of a preceding layer to achieve pipeline computation.

15. The method of claim 14, wherein each of said Step 1 and Step 2 further comprises:
while computing matrix-vector multiplication for a present input vector, computing the activation $h_t$ of the hidden layers and the RNN's output $y_t$.

16. The method of claim 14, wherein:
said initial step, step 1 and step 2 are processed sequentially; and
said step 1 and step 2 are processed periodically.

* * * * *